(12) United States Patent
Aspert et al.

(10) Patent No.: US 9,286,501 B2
(45) Date of Patent: Mar. 15, 2016

(54) METHOD AND DEVICE FOR IDENTIFYING A TWO-DIMENSIONAL BARCODE

(71) Applicant: SICPA HOLDING SA, Prilly (CH)

(72) Inventors: Francois Aspert, Lausanne (CH); Julien Begard, Renens (CH); David Leroux, Perly (CH)

(73) Assignee: SICPA HOLDING SA, Prilly (CH)

( * ) Notice: Subject to any disclaimer, the term of this patent is extended or adjusted under 35 U.S.C. 154(b) by 0 days.

(21) Appl. No.: 14/437,629

(22) PCT Filed: Apr. 30, 2013

(86) PCT No.: PCT/EP2013/059034
§ 371 (c)(1),
(2) Date: Apr. 22, 2015

(87) PCT Pub. No.: WO2014/063836
PCT Pub. Date: May 1, 2014

(65) Prior Publication Data
US 2015/0302236 A1    Oct. 22, 2015

(30) Foreign Application Priority Data
Oct. 23, 2012    (EP) .................................... 12189591

(51) Int. Cl.
*G06K 7/00* (2006.01)
*G06K 7/14* (2006.01)

(52) U.S. Cl.
CPC ............ *G06K 7/1417* (2013.01); *G06K 7/1443* (2013.01); *G06K 7/1452* (2013.01)

(58) Field of Classification Search
CPC ............. G06K 7/00; G06K 9/18; G06K 9/36; G06K 9/80
USPC ............... 235/462.09, 462.1, 462.01, 462.07, 235/462.11
See application file for complete search history.

(56) References Cited

U.S. PATENT DOCUMENTS

2006/0043189 A1*  3/2006  Agrawal ................... G06K 7/14
235/462.08

OTHER PUBLICATIONS

Cheng et al., "A scanning method for Dotted Data Matrix," Eighth International Conference on Intelligent Systems Design and Applications, 2008. ISDA '08, Nov. 26, 2008, pp. 179-183.
(Continued)

*Primary Examiner* — Edwyn Labaze
(74) *Attorney, Agent, or Firm* — Greenblum & Bernstein, P.L.C.

(57) ABSTRACT

A method of identifying a two-dimensional bar code in digital image data of the bar code, the bar code comprising first and second type elements arranged in an ordered grid and having an outline that comprises an L-shape clock line with transitions between the first and second type elements and an L-shape solid line without transitions between the first and second type elements, wherein approximate corners in the digital image data determine a first and a second pair of opposite edge segments along the outline, the method comprising scanning in the digital image data a first edge segment of the first pair and counting transitions between the first and second type elements along the first edge segment of the first pair; if no transitions were counted along the first edge segment of the first pair, then scanning in the digital image data the second edge segment of the first pair and counting transitions between the first and second type elements along the second edge segment of the first pair; scanning in the digital image data a first edge segment of the second pair and counting transitions between the first and second type elements along the first edge segment of the second pair; if no transitions were counted along the first edge segment of the second pair, then scanning in the digital image data the second edge segment of the second pair and counting transitions between the first and second type elements along the second edge segment of the second pair; identifying the edge segment of the first pair and the edge segment of the second pair along which transitions were counted as the L-shape clock line of the bar code, and identifying the edge segment of the first pair and the edge segment of the second pair along which no transitions were counted as the L-shape solid line of the bar code.

17 Claims, 8 Drawing Sheets

(56) References Cited

OTHER PUBLICATIONS

Dita et al., "Data Matrix Code—A Reliable Optical Identification of Microelectronic Components," 2011 IEEE 17th International Symposium for Design and Technology Electronic Packaging (SIITME), Oct. 20, 2011, pp. 39-44.

Huang et al., "Data Matrix Code Location Based on Finder Pattern Detection and Bar Code Border Fitting," Mathemathical Problems in Engineering, vol. 2012, 2012, pp. 1-13.
Gioi et al., "LSD: a Line Segment Detector," Image Processing On Line, Mar. 24, 2012, pp. 1-12.
International Preliminary Report on Patentability in related application No. PCT/EP2013/059034 dated Feb. 9, 2015.

* cited by examiner

PRIOR ART

PRIOR ART

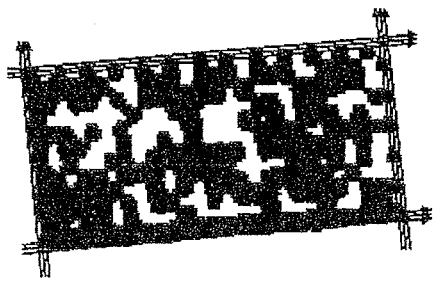
Fig. 4I
Fig. 4J
 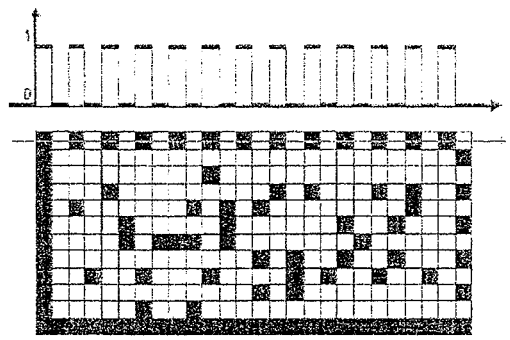
Fig. 5A  Fig. 5B
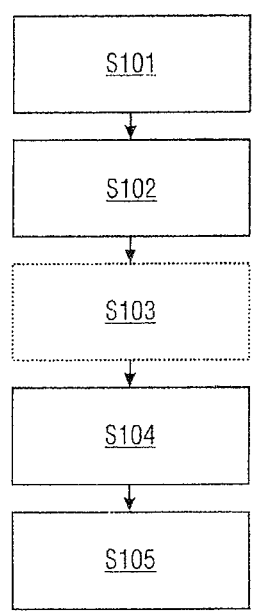 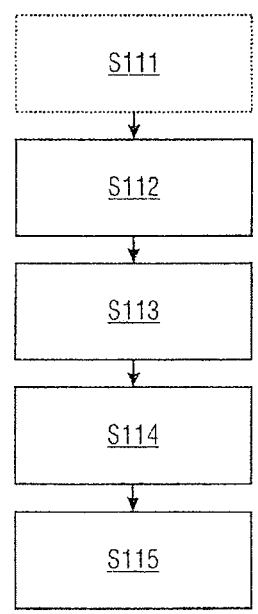

METHOD AND DEVICE FOR IDENTIFYING A TWO-DIMENSIONAL BARCODE

TECHNICAL FIELD

The present invention relates to identifying a two-dimensional bar code. Specifically, the present invention relates to a method of identifying a two-dimensional bar code in digital image data of the bar code, an apparatus configured to identify a two-dimensional bar code, particularly to corresponding hand-held devices and fixed module-type devices. The present invention also relates to a corresponding computer programs and computer readable media.

BACKGROUND

Nowadays, one-dimensional and two-dimensional bar codes are ubiquitous in the form of so-called "tags". Specifically, such bar codes can be found on consumer products, electronic and non-electronic devices, machines, vehicles, and also on documents, such as tickets, papers, currency bills etc. Besides the one-dimensional bar code also the two-dimensional bar code has gained in significance during recent years. Whereas the one-dimensional barcode is classically limited to encoding information only in one linear dimension, the two-dimensional bar code, comprising at least first and second type elements arranged in an ordered grid, allows for substantially increasing amount of data amount that can be encoded.

FIGS. 1A and 1B show schematic views of conventional two-dimensional bar codes that encode information by means of arranging at least first and second type elements, such as rectangles, dots, triangles and the like, for encoding information. At least two distinguishable types of elements are used for encoding information in form of binary units, i.e. bits. For example, a white-printed square as a first type element may represent the information "0", whereas a black-printed square as a second type element represents the information "1".

FIG. 1A shows a schematic view of a two-dimensional bar code according to the GS1 (Trademark) DataMatrix ECC 200 standard (GS1 being an international association providing standards for two-dimensional barcodes). This two-dimensional bar code comprises two main areas, namely the so-called "finder pattern" 10 and the data 20. The latter data 20 carries the actual payload data of the bar code and comprises first and second type elements 21, 22 arranged in an ordered grid. The finder pattern 10 is also composed of the first and second type elements, and is, in turn, divided into the so-called "L finder pattern" 11 (also called L-shape solid line, L-line, solid line, etc.) and the so-called "clock track" 12 (also called clock line, L-shape clock line etc.).

According to a convention, the clock line 12 is formed by linearly alternating the arrangement of first and second type elements 21, 22. Therefore, the clock line 12 provides transitions between said first and second type elements 21, 22, whereas the solid line 11 does not. Both segments (or legs) of both the solid line 11 and the clock line 12 intersect at a corner in a substantially perpendicular fashion. Thus, a rectangle-like outline of the two-dimensional barcode is formed by the solid line 11 and the clock line 12.

According to another convention, the intersecting element of the two segments of the clock line 12 is of a pre-determined type, namely either the first type 21 or the second type 22. Specifically, a current convention defines this intersection element 13 as a light element, for example in the context of the present disclosure a first type element, as opposed to dark elements, for example in the context of the present disclosure a second type element.

Whereas FIG. 1A shows a square version of the DataMatrix bar code 1, the current conventions are not limited to square like bar codes and FIG. 1B shows an example of a rectangle implementation 1'. Again, the two-dimensional bar code is delimited by an outline comprising an L-shape solid line 11' and an L-shape clock line 12'. However, since the general outline is not limited to squares, one segment 111' of the solid line 11' may be shorter than the other segment 112' of the solid line 11'. Correspondingly, one segment 121' of the clock line 12' can be shorter than the other segment 122'.

Generally, the first and second type elements 21, 22 may take any distinguishable form. This aspect is depicted in FIG. 2A that shows the first type element 21 as a general right-hatched square/rectangle and the second type element as a general left-hatched square/rectangle 22. This generalization comes from the fact that a two-dimensional bar code is not necessarily printed by using, for example, a black dye on white paper. Rather, the two-dimensional bar code can be well implemented also by means of color dyes or inks; thermo printing on heat-sensitive paper; mechanical means, such as milling, embossing, grinding, etc.; or physical/chemical means, such as laser etching, acid etching, etc. Any type of implementation is possible as long as the elements can be distinguished into their respective type in, for example, digital image data that has been obtained from the two-dimensional bar code being. For example, a digital camera can obtain digital image data of two-dimensional bar code that is printed on a paper document or laser-etched on a metal can.

Further, the various printing techniques may also result in different "qualities" of a two-dimensional bar code. Besides the somewhat optimal representation (as shown for example in FIGS. 1A and 1B), also implementations with individual elements are possible, such as shown in conjunction with FIG. 2B. There, even the solid line 11 has interruptions between two adjacent elements of the same type 22. However, the average width of such interruptions may still ensure the characteristics of no transition in element type between adjacent elements as shown with reference numeral 28. On the other hand, a transition between the element type can be still identified by means of the characteristic width of the interruption as shown by reference numeral 29.

FIG. 2C shows a somewhat opposite situation in which even diagonally adjacent elements merge. However, also in this case it is assumed that the first and second type elements can be distinguished and that their respective association to positions in an ordered grid is still possible.

The decoding of a two-dimensional bar code usually begins with taking a photographic image of the two-dimensional barcode on a given item, such as a consumer product or document. This image is then obtained as digital image data defining respective pixel values for the pixels of the image. This digital image data is then subject to image processing by means of a processing unit (e.g., CPU, computer, server, embedded system, ASIC, etc.). Such processing may be divided into various individual steps for eventually decoding the data that is encoded in the two-dimensional bar code.

Since the image of the two-dimensional bar code is usually taken with an arbitrary perspective, meaning that the precise distance, angle, and general orientation of the imaging device (e.g. a CCD camera) relative to the two-dimensional bar code is unknown. Therefore, it may be necessary to first identify the image or area of the two-dimensional bar code within given digital image data. Once the two-dimensional barcode has been identified in the digital image data, processing may proceed to identifying and decoding the individual elements of the bar code data.

The initial steps of image processing may thus include the determination of so-called approximate corners of the two-dimensional bar code within given digital image data. Then the four segments connecting these four approximate corners to a rectangle, or—more generally—a 4-polygon, can be scanned for determining the length in individual pixels and/or elements and for counting the transition between first and second type elements.

A conventional method involves for the above purpose eight scanning operations in which each of the four segments is first scanned to determine the length in terms of pixels and/or elements and then scanned for counting transitions between the first and second type elements along this segment. Having this information at hand, the long and short segments of the solid line as well as the long and short segments of the clock line can be identified. The same applies for square implementations of the two-dimensional bar code in that the two segments of the clock line and the solid line have identical length, at least in terms of elements. The processing may then proceed to identifying the pay load data since the structure of the grid and the relative position of each identified element within this grid can be obtained.

Since use of two-dimensional bar codes becomes more and more common, also the requirements on identifying and/or decoding two-dimensional bar codes become more and more demanding. Specifically, it may be required to identify and/or decode a two-dimensional bar code fast and, nevertheless, in a reliable fashion. For example, two-dimensional bar codes may be used in production lines where a large number of individual items, such as consumer products (e.g., food packages, metal cans, electronic devices, etc.), have to be identified within a short period of time. A specific example could be a filling line of beverage cans, in which the individual cans pass by a certain observation point with high speed so that only a few milliseconds may be available to identify one individual can. Therefore, a two-dimensional bar code being applied to the individual item needs to be identified and decoded within only a couple of milliseconds or less.

Therefore, there is a demand for improving the time efficiency of existing identification and decoding schemes so that the overall time required from taking an image of two-dimensional bar codes to eventually obtaining the decoded pay load data of the two-dimensional bar code can be minimized. At the same time, however, the improved method shall also provide reliability in terms of correct identification and/or decoding of the two-dimensional bar code.

SUMMARY

The above-mentioned objects and problems are solved by the subject matter of the independent claims. Further preferred embodiments are defined in the dependent claims.

According to one aspect of the present invention a two-dimensional bar code is identified in digital image data of the bar code, the bar code comprising first and second type elements arranged in an ordered grid and having an outline that comprises an L-shape clock line with transitions between the first and second type elements and an L-shape solid line without transitions between the first and second type elements, wherein approximate corners in the digital image data determine a first and a second pair of opposite edge segments along the outline, this aspect comprising scanning in the digital image data a first edge segment of the first pair and counting transitions between the first and second type elements along the first edge segment of the first pair; if no transitions were counted along the first edge segment of the first pair, then scanning in the digital image data the second edge segment of the first pair and counting transitions between the first and second type elements along the second edge segment of the first pair; scanning in the digital image data a first edge segment of the second pair and counting transitions between the first and second type elements along the first edge segment of the second pair; if no transitions were counted along the first edge segment of the second pair, then scanning in the digital image data the second edge segment of the second pair and counting transitions between the first and second type elements along the second edge segment of the second pair; identifying the edge segment of the first pair and the edge segment of the second pair along which transitions were counted as the L-shape clock line of the bar code, and identifying the edge segment of the first pair and the edge segment of the second pair along which no transitions were counted as the L-shape solid line of the bar code.

According to another aspect of the present invention a two-dimensional bar code is identified in digital image data of the bar code, the bar code comprising first and second type elements arranged in an ordered grid and having an outline that comprises an L-shape clock line with transitions between the first and second type elements and an L-shape solid line without transitions between the first and second type elements, an intersection element at the corner of the L-shape clock line being of a predetermined type from the first and second type, wherein approximate corners in the digital image data determine a first and a second pair of opposite edge segments along the outline, this aspect comprising scanning in the digital image data a first edge segment of the first pair and counting transitions between the first and second type elements along the first edge segment of the first pair; if no transitions were counted along the first edge segment of the first pair, then scanning in the digital image data the second edge segment of the first pair and counting transitions between the first and second type elements along the second edge segment of the first pair; determining which extremity of the edge segment of the first pair along which transitions were counted corresponds to the intersection element; scanning the edge segment of the second pair having the intersection element and counting transitions between the first and second type elements along the edge segment of the second pair having the intersection element; identifying the edge segment of the first pair and the edge segment of the second pair that intersect at the intersection element as the L-shape clock line of the bar code, and identifying the edge segment of the first pair and the edge segment of the second pair that not being part of the L-shape clock line as the L-shape solid line of the bar code.

According to further aspects, a related apparatus, a related computer program, and a related computer-readable medium are provided.

BRIEF DESCRIPTION OF THE DRAWINGS

Embodiments of the present invention, which are presented for better understanding the inventive concepts and which are not the same as limiting the invention, will now be described with reference to the figures in which:

FIGS. 4A to 4J show additional schematic views accompanying the description of the decoding process described in conjunction with FIG. 3;

FIGS. 5A and 5B show flow charts of process details according to embodiments of the present invention;

DETAILED DESCRIPTION

Figure 3:
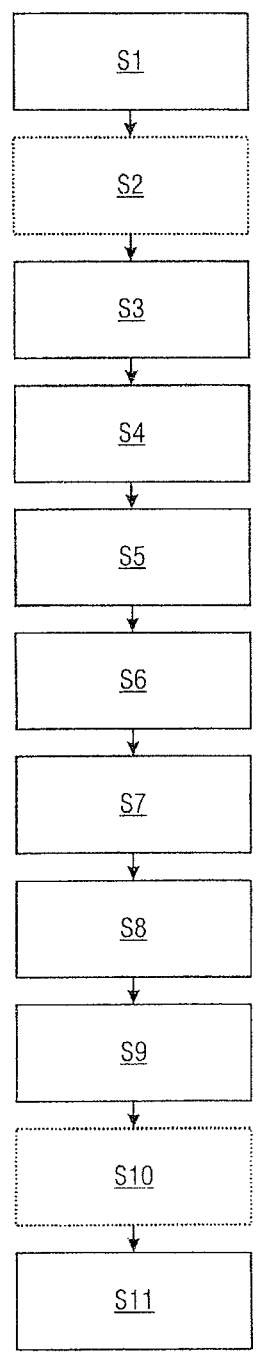
FIG. 3 shows a flow chart of a decoding process of two-dimensional in which embodiments of the present invention can be employed.

FIG. 3 shows a flowchart of a possible decoding process involving the identification and the decoding of a two-dimensional bar code. This process starts from a raw image of the two-dimensional bar code, possibly attached to an item or document. The image is obtained as digital image data from the two-dimensional barcode by means of, for example, conventional digital cameras, video cameras, CCD cameras, scanners, and the like.

Figure 4A:
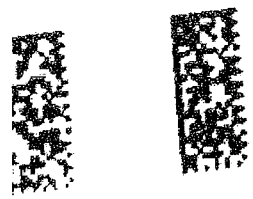

In a first step S1 (=THRESHOLDING), raw digital input data is subject to a thresholding operation for the purpose of binarization of the input image. In general, thresholding involves marking of individual pixels of digital image data with regard to their pixel value. In the simplest form of the thresholding, the pixel value of each pixel is compared to some threshold value and, e.g., any pixel with a value at or above this threshold value is assigned to a first group, whereas any pixel with a value below the threshold is assigned to a second group. In this way, a binarized image is obtained that only comprises first and second group pixels. The purpose of thresholding is to provide some means to distinguish in digital image data objects (of possible interest) from background. FIG. 4A shows such a binarized image after thresholding in which the two groups are represented by black and white colors. The image shows a couple of features of which one is already a good candidate for being a two-dimensional bar code.

Figure 4B:
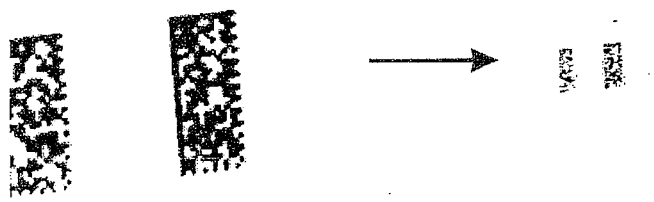

In optional step S2 (=RESCALING) the data obtained from the thresholding operation can be rescaled for downscaling the image by a given factor. This may substantially speed up the approximate localization of the bar code in the digital image data. As long as no important features are lost by the rescaling, it is apparent that a reduction of the data may substantially contribute to accelerate any following scanning operation. As shown in FIG. 4B, a downscaling by a fixed factor of 16, results in the width and height of the re-sized image being reduced by a factor of four.

Figure 4C:
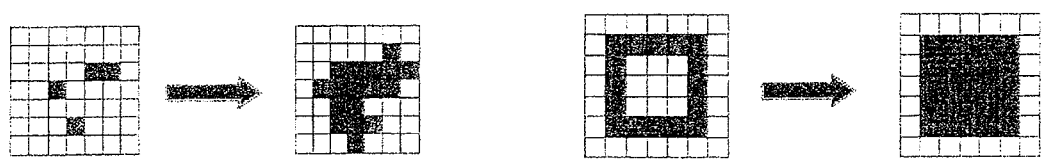

In step S3 (=DILATATION), the thresholded or the thresholded and rescaled image data is subject to dilatation and hole filling. This step accordingly involves merging and filling of adjacent pixels of a given value, e.g. black pixels, until a number of blocks in the image is constant. In other words, the dilatation and filling steps can be iterated until the number of blocks remains constant. FIG. 4C shows the process of dilatation (left) and hole filling (right).

Figure 4D:

At this stage, the digital image data may, nevertheless, comprise more than one form that can be interpreted as a potential candidate of the two-dimensional bar code. Therefore, in a subsequent step S4 (=BLOB DETECTION), blob detection is carried out in order to filter the forms. This may involve searching and enumerating of all forms in the image and erasing all the forms with a low area so that small objects and noise are removed. It may then be considered to keep the biggest form which is then supposed to be the best candidate for the two-dimensional bar code within the image data. The result of this operation is shown in conjunction with FIG. 4D.

Figure 4E:
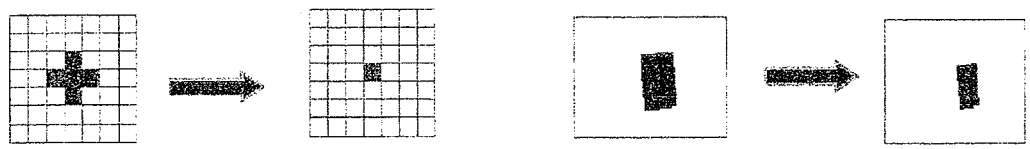

In a subsequent step S5 (=EROSION), an erosion is carried out on the data as obtained by step S4 in order to retrieve the original contours of the image. For this purpose it can be considered to apply the same number of the erosion steps as the number of steps that have been applied using the preceding dilatation (cf. step S3). The result in the processed image data is shown in conjunction with FIG. 4E, in which also detailed view of erosion is shown (left).

Figure 4F:

In a subsequent step S6 (=HIGHLIGHT BORDERS), the borders of the two-dimensional bar code are highlighted. This may involve the application of a filter on the image data that detects pixel intensity variation. In general, a conventional edge detection algorithm may be employed. Again, the resulting effect within the processed image data is shown in conjunction with FIG. 4F.

In a following step S7 (=BORDER EQUATIONS), the border equations are calculated. This may be effected, for example, by conventional means such as detecting parametric objects (lines, circles, etc., using the so-called Hough transform).

Figure 4G:
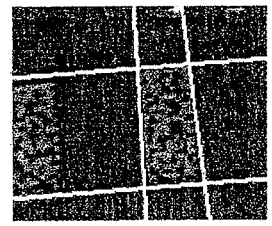

This involves a transformation of data in a Cartesian coordinate system (x,y) into a polar coordinate system (R, θ), i.e. from y=ax+b to R=x cos(θ)+y sin(θ). Therein, R is the distance to the origin, whereas θ is the edge angle from the gradient image. Then, an accumulator array is incremented from these values and final lines are obtained from the four best scores in the accumulator. Again, the result of this operation is shown in conjunction with FIG. 4G.

Figure 4H:
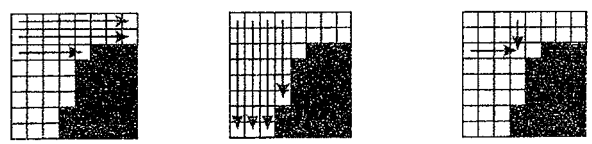

In the following step S8 (=CORNER EXTRACTION), the corners can be extracted. Since the Hough lines intersections are only approximation corners of the two-dimensional bar code, better and more accurate coordinates may have to be computed. This may be effected by a line-by-line (respectively column-by-column) scan in a small region around the approximate corners until a black pixel is reached. The approximate corners can be determined by intersecting lines of the border as calculated in step S7. The coordinates of the detected black pixel can then be used as a better approximate for the coordinates of the corner. A small region of interest (located in the original image) can be used to ensure maximum precision and fast speed operation. This respective concept is again further explained in conjunction with FIG. 4H.

Figure 1A:
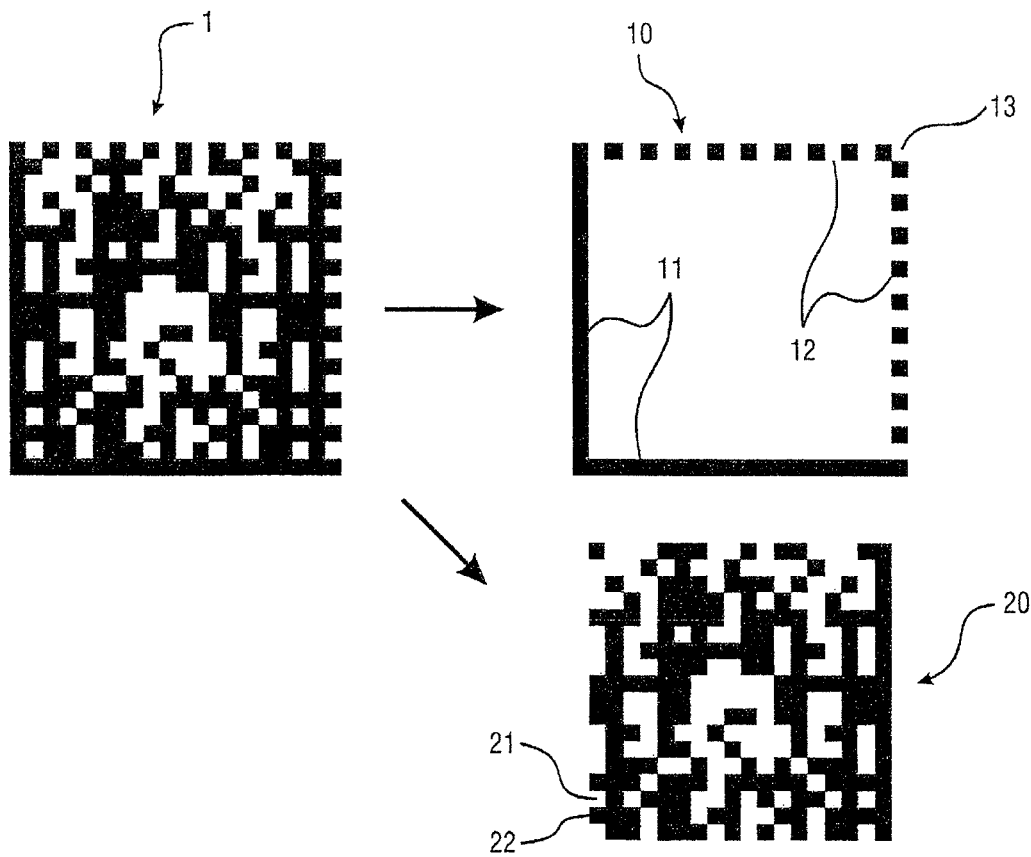
FIGS. 1A and 1B show schematic views of a square-like and a rectangle-like implementation of a two-dimensional bar code as a possible input to embodiments of the present invention.

In a subsequent step S9 (=IDENTIFY LINES), the parameters of the two-dimensional bar code are identified. This may specifically apply to the identification of the L-shape solid line and the L-shape clock line of a DataMatrix bar code as described in conjunction with FIGS. 1A and 1B. This may involve the counting of the number of black pixels along each segment so as to obtain a so-called score value. The scanned segment that has obtained the highest score value is identified as the longest segment of the L-shape solid line, the scanned segment that has obtained the second highest score value and that is substantially perpendicular to the identified longest segment of the L-shape solid line is identified as being the second segment of said L-shape solid line (the angle being calculated from the equations of the border line as obtained in step S7). The two remaining segments form the L-shape clock line. The scanning within actual image data is shown in conjunction with FIG. 4I.

If optional rescaling applied in step S2, then in a subsequent step S10 (=RECOVER SIZE), the size of the two-dimensional bar code and the initial grid location are recovered. This may involve the scanning of the clock line borders identified in step S9 and to count the number of transitions so as to determine the size of the grid. This may also involve verifying the transition repartition in space. Optionally, the results can be validated by comparing the transitions count with a normalized size of a two-dimensional bar code, e.g., 16×16, 12×26, etc. It is further possible to let the application compute the size or to force to a desired fixed value. This aspect is further described in conjunction with FIG. 4J.

In a next step S11 (=SAMPLING/DECODE), sampling and decoding is performed taking into account that the initial grid location may not be perfect in terms of sampling quality, the initial grid location being calculated from the coordinates of the corners as obtained in step S8 and the size of the grid being the one as calculated in step S10 or, in case of no size-recovering in step S10, a size directly obtained by counting the transitions of the L-shape clock line of the two remaining segments as found in step S9. Again, this may also involve verifying the transition repartition in space or an optional validation of the results as described for step S10. Therefore, a heuristic search pattern for minimizing the number of error corrections code words can be used in the Reed-Solomon algorithm. The grid can be moved along the search path until a sufficient quality is achieved and, if a proper location is found, sampling is performed. If the two-dimensional bar code or the image thereof is distorted (e.g., stemming from printing and/or image acquisition), a 3×3 affine transformation matrix can be computed. This maps an ideal two-dimensional bar code grid to the actual grid. This transformation may enable to retrieve precisely the real coordinates of any elements in the ideal grid while correcting various range of defects.

In general, steps S2 to S9 aim at retrieving the outline of the two-dimensional bar code, i.e. the segments of the outline and the beginning and end (extremities) of each segment. Two of the segments (a pair of opposite segments) are usually parallel to each other forming the outline with a typical aspect ratio and size. In other words, the steps detect an object within the image having a global shape similar to a two-dimensional bar code of a given type and standard (e.g. DataMatrix), the similarities being based on the detection of four edges approximately forming a parallelogram.

FIG. 5A shows a flow chart of a method embodiment of the present invention. Specifically, this embodiment concerns the method as already introduced in conjunction with FIGS. 3 and 4A onwards. The steps S101 to S105 as they will be now explained in conjunction with FIG. 5A replace all steps S1 to S8 as explained in conjunction with FIG. 3.

This method embodiment likewise refers to identifying a two-dimensional bar code in digital image data of the bar code. Thus, it is again assumed that an image has been obtained from the bar code that will likely be already attached to an item, document or product. The digital image data will thus contain also parts that show this item, document, or product, together with some background or other items that belong, for example, to handling equipment or a production line. Also in this embodiment it is assumed that the bar code comprises first and second type elements arranged in an ordered grid and that the bar code has an outline that comprises an L-shape solid line without transitions between the first and second type elements.

According to this embodiment, it is calculated in a first step S101 (=CALCULATING GRADIENT) a gradient field from the digital image data, the gradient field specifying a gradient of the pixel value in the digital image data. Then gradient magnitude data is calculated from the gradient field so as to obtain a scalar value for each pixel representing the gradient magnitude. This calculation of the gradient may, in turn, involve some preparatory processing depending on the condition and resolution (size) of the input digital image data. These steps are shown in conjunction with FIG. 5B.

If necessary, the raw input image is resized in optional step S111 (=RESIZE/RESCALE), for example by rescaling via bilinear sub-sampling. Similar aspects may apply as they have been described earlier in conjunction with FIG. 4B. Then the resized image can be smoothed via a Gaussian filter in a step S112 (=SMOOTHENING), by for example a blurring step with a fixed zoom factor. A typical value of the zoom factor may be determined on the basis of the known dot size, wherein dots are enlarged up to the point that neighboring points tend to contact and to form a line). Subsequently, in step S113 (=CONTRAST LEVEL DETECTION) a detection of levels of contrast is carried out on the smoothed image. Here, a Sobel operator may calculate a two-dimensional spatial gradient on the image data. In step S114 (=APPROXIMATE GRADIENT) an approximate gradient magnitude is calculated implying that an edge strength is approximately calculated at each image pixel. Then in step S115 (=NON-MAX SUPPRESSION) a non-max suppression operation is carried out on the magnitude of the gradients, meaning that the image is scanned along the image gradient direction, and if pixels are not part of the local maxima they are set to zero with the effect that all image information that is not part of local maxima is suppressed. This operation allows for eliminating poor contrasts, noise, background, etc. Thus, it can be assumed that only the features remaining correspond to the two-dimensional bar code. This may include the assumption that the ink response to illumination, when taking the raw image, is supposed to be the highest, particularly as compared to the background response.

With again reference to FIG. 5A, the process continues with step S102 (=THRESHOLDING OPERATION) on the basis of the obtained gradient field. Specifically, according to this embodiment, it is performed in step S12 a thresholding operation on the calculated gradient magnitude data and edge segment image data is obtained. The thresholding operation may involve a separation of light and dark regions based on the magnitude of the gradients. This may provide the advantage that the pixel value dynamics is larger, in that the range of values to be sampled is very large as compared to the values of the image pixels as such (e.g. dynamics is limited to only 256 values). The Otsu method of clustering can be employed to obtain a better visibility of the variations, such that a gradient thresholding allows better separating the background information from the information representing the two-dimensional bar code in the digital image data. Finally, a resize operation can be carried out, if applicable, in order to recover the original scale. For this purpose, an inverse rescaling via bilinear resampling may apply without eliminating the effects of the blurring step. In this way a binarized image can be obtained with only some enlarged dots and segments. Thus, segments can be detected.

If optional rescaling applied in step S111, then in a subsequent step S103 (=RECOVER SIZE), the size of the two-dimensional bar code and the initial grid location are recovered. Generally, the concepts of step S10 as described in conjunction with FIG. 3 may also apply here.

The process then continues with step S104 (=DETECTING LINEAR SEGMENTS) on the basis of the obtained thresholded image data. Specifically, according to this embodiment, it is performed in step S104 a detecting of linear segments in the edge segment image data. For this purpose, an edge follower algorithm may be employed for detecting the beginning and the end of each segment in the binarized image resulting from the edge detection step and evaluating the neighboring segments, for example, based on distance and angle by using the so-called LSD algorithm or a Hough transform. The former LSD algorithm as described and published in: R. G. v. Gioi, J. Jakubowicz, J.-M. Morel, and G. Randall "LSD: A Line Segment Detector" (in: Image Processing On Line, 2012; http://dx.doi.org/10.5201/ipol.2012.gjmr-lsd). Optionally, a merging of two collinear segments may be considered in order to form longer segments (iteratively) among a list of segments.

Based on the detected segments, pairs of the detected linear segments are identified based on at least an angular criterion between two of the detected linear segments in step S105 (=IDENTIFYING PAIRS). Also, a (second) distance criterion may apply that considers the distance between closest extremities of the segments obtained by means of applying the (first) angular criterion. Said distance may be compared as to being lower than a predetermined threshold (ideally, the distance vanishes for an ideal vertex of an L-shape). In other words, a "best L" is searched within possible candidates of segment pairs. For this purpose, the angular criterion may consider only roughly orthogonal segments, that are most likely to represent the L-shape solid line or "finder pattern" forming the L boundary of a DataMatrix two-dimensional bar code. As a basis, the segments previously found may be taken by identifying those which are good candidates for constituting the L-shape. For example in a standard orientation the corner on the lower left of a DataMatrix bar code is the originator for a short segment corresponding to height and a long segment corresponding to the length of the bar code (cf. FIG. 1B).

The "best L" is then completed to a square, rectangle, parallelogram, or—in general—rectangle, square, or 4-polygon, in order to obtain all four approximate corners on which subsequent steps can be based. Specifically within the aforementioned LSD algorithm, any L-shape can define a rectangle by mirroring the L-shape and completing the two L-shapes to a rectangle. Alternatively, according to the Hough transform the rectangle or polygon is completed by the L-shape solid line and the clock line.

Figure 6A:
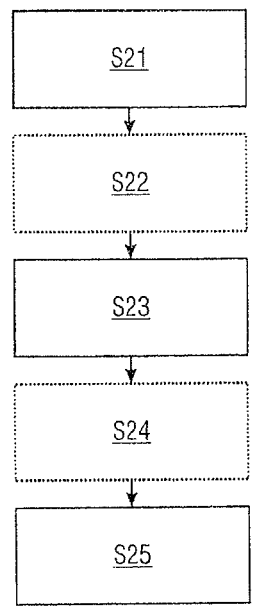
FIGS. 6A and 6B show flow charts of process details according to embodiments of the present invention.

FIG. 6A shows a flow chart of a method embodiment of the present invention. Specifically, this embodiment concerns the method as already introduced in conjunction with FIGS. 3 and 4A onwards. The steps S21 to S25 as they will be now explained in conjunction with FIG. 6A replace step S9 as explained in conjunction with FIG. 3. Likewise, steps S21 to S25 may also follow step 105 as explained in conjunction with FIG. 5A.

Figure 1B:
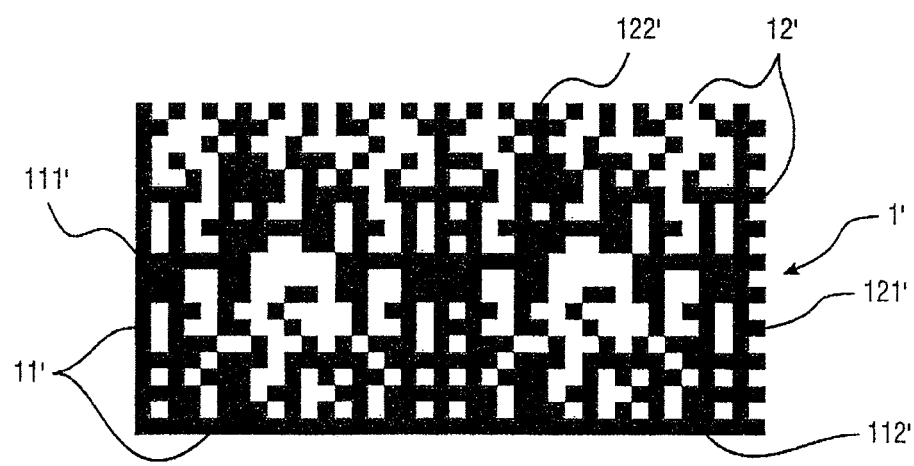
Figure 2A:
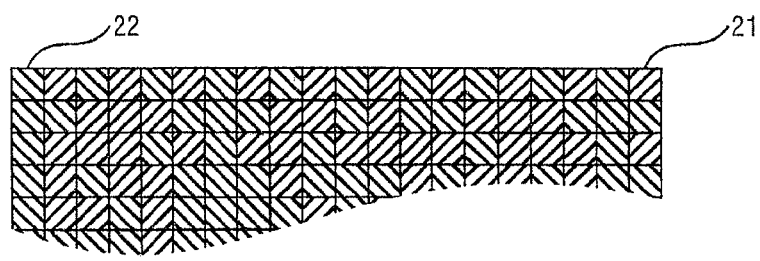
FIG. 2A shows a schematic view of a general implementation of a two-dimensional bar code as a possible input to embodiments of the present invention.
Figure 2B:
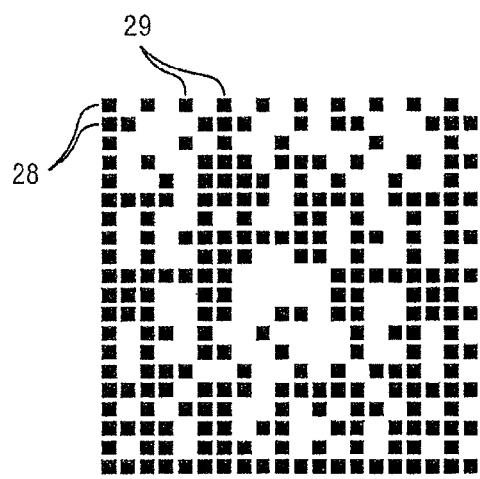
FIGS. 2B and 2C show schematic views of further implementation of a two-dimensional bar code as a possible input to embodiments of the present invention.
Figure 2C:
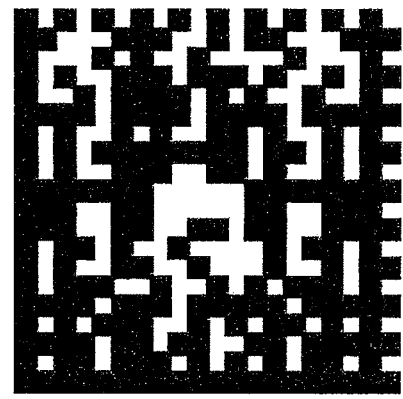

This method embodiment likewise refers to identifying a two-dimensional bar code in digital image data of the bar code. The bar code comprises first and second type elements arranged in an ordered grid and the bar code has an outline that comprises an L-shape clock line with transitions between the first and second type elements and an L-shape solid line without transitions between the first and second type elements. Approximate corners determine in the digital image data a first and a second pair of opposite edge segments along the outline. In other words, this embodiment assumes that for example the clock line segment 122' as shown in FIG. 1B and the corresponding solid line segment 112' appear as on pair of opposite edge segments in the digital image data, whereas segments 111' and 121' appear as another pair of opposite edge segments.

This embodiment considers that the approximate corners, and hence the segment pairs (i.e. lines), are known in the digital image data by, for example, the processes as described in conjunction with FIG. 3 or 5A. In a first step S21 (=FIRST SEGMENT OF FIRST PAIR) it is scanned in the digital image data a first edge segment of the first pair and transitions are counted between the first and second type elements along the first edge segment of the first pair. The scanning and the counting may be effected as separate processes or at the same time. The scanning as such may thus refer to the process of scanning along a line within digital image data so as to determine a (pixel) value at the position along the line (cf. also FIGS. 4I & 4J).

In the conditional step S22 (=SECOND SEGMENT OF FIRST PAIR), if no transitions were counted along the first edge segment of the first pair (i.e. in step S21), it is scanned in the digital image data the second edge segment of the first pair and transitions are counted between the first and second type elements along the second edge segment of the first pair. If already in step S21 transitions were counted it can be determined that the scanned first segment of the first pair is one segment/leg of the L-shape clock line. The scanning and counting with regard to the second segment of the first pair can hence be omitted since the length can be assumed to be same as of the first segment and—the two-dimensional bar code following the conventions—the second segment will not feature any transitions that need to be counted.

Similarly, the process continues in step S23 (=FIRST SEGMENT OF SECOND PAIR) with scanning in the digital image data a first edge segment of the second pair and counting transitions between the first and second type elements along the first edge segment of the second pair. Again, in the conditional step S24 (=SECOND SEGMENT OF SECOND PAIR), in the digital image data the second edge segment of the second pair is scanned and transitions between the first and second type elements along the second edge segment of the second pair are counted, if no transitions were counted along the first edge segment of the second pair. The conditional character of step S24 becomes again clear from, for example, FIGS. 1A and 1B, in the same way as for conditional step S22.

Then, the process may continue in step S25 (=IDENTIFY SOLID & CLOCK LINE) with identifying the edge segment of the first pair and the edge segment of the second pair along which transitions were counted as the L-shape clock line of the bar code, and identifying the edge segment of the first pair and the edge segment of the second pair along which no transitions were counted as the L-shape solid line of the bar code. Having also the transition counts of both segments with transitions the orientation and the longer and shorter sides of the two-dimensional bar code can be determined. The number of transitions may also pave the way for defining the ordered grid in order to decode the bar code.

The advantage over conventional processing becomes apparent when considering the typical method that considers scanning the pixels of all the edges of the candidate rectangle in order to detect transitions or no transition. In the latter case, a segment of the solid line was scanned, otherwise a segment of the clock line was scanned. Further, each scanned pixel/element is counted to detect both the long and the short segments. In all, eight counting/scanning operations are required, i.e. two for each of the four segments forming the outline.

According to this embodiment, however, the scanning/counting operations can be reduced to four, three, or even down to two. Therefore, in every case a substantial improvement in efficiency is obtained over conventional techniques. This stems from the fact that the scanning and the counting can be effected at the same time. Therefore, even if all four segments are scanned and counted simultaneously, since for example both first segments of both pairs have no transitions, the number of required operation is halved. Further, instead of considering successively the segments around the rectangle, only a first segment of a first pair of opposite sides is scanned to detect the presence of transitions, and only the transitions need to be counted for determining the short and long part of the clock line. If no transition is detected then the scanned edge corresponds to one edge the L-shape solid line, if at least one transition is detected then the scanned edge may be considered to correspond to one edge of the clock line.

Figure 6B:
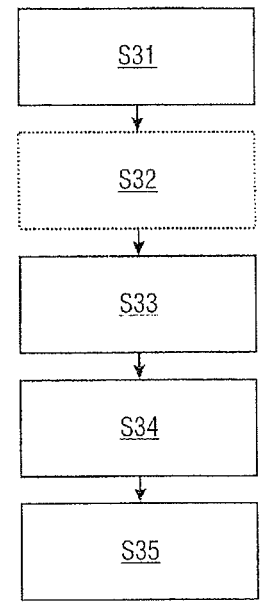

FIG. 6B shows a flow chart of a method embodiment of the present invention. Specifically, this embodiment concerns the method as already introduced in conjunction with FIGS. 3 and 4A onwards. The steps S31 to S35 as they will be now explained in conjunction with FIG. 6B replace step S9 as explained in conjunction with FIG. 3. Likewise, steps S31 to S35 may also follow step 105 as explained in conjunction with FIG. 5A.

This method embodiment likewise refers to identifying a two-dimensional bar code in digital image data of the bar code. The bar code comprises first and second type elements arranged in an ordered grid and the bar code has an outline that comprises an L-shape clock line with transitions between the first and second type elements and an L-shape solid line without transitions between the first and second type elements. Approximate corners again determine in the digital image data a first and a second pair of opposite edge segments along the outline. Further, the two-dimensional bar code follows the convention that an intersection element at the corner of the L-shape clock line is of a predetermined/known type selected from the first and second type.

This embodiment is able to further improve the efficiency, by, in a first step S31 (=FIRST SEGMENT OF FIRST PAIR), scanning in the digital image data a first edge segment of the first pair and counting transitions between the first and second type elements along the first edge segment of the first pair. Again, if no transitions were counted along the first edge segment of the first pair, then scanning in the digital image data the second edge segment of the first pair and counting transitions between the first and second type elements along the second edge segment of the first pair (cf. conditional step S32=SECOND SEGMENT OF FIRST PAIR).

Due to the known (predetermined) type of the intersection element (cf. element 13 in FIG. 1A), it can be determined in step S33 (=DETERMINING EXTREMITY) which extremity of the edge segment of the first pair along which transitions were counted corresponds to the intersection element. Thus, the process may directly proceed in step S34 (=SEGMENT OF SECOND PAIR) to scanning the edge segment of the second pair having the intersection element and counting transitions between the first and second type elements along the edge segment of the second pair having the intersection element, and in step S35 (=IDENTIFY SOLID & CLOCK LINE) to identifying the edge segment of the first pair and the edge segment of the second pair that intersect at the intersection element as the L-shape clock line of the bar code, and identifying the edge segment of the first pair and the edge segment of the second pair that not being part of the L-shape clock line as the L-shape solid line of the bar code. Thus, in this embodiment only three or two operations are necessary due to determining the extremity as in step S33.

Figure 7A:
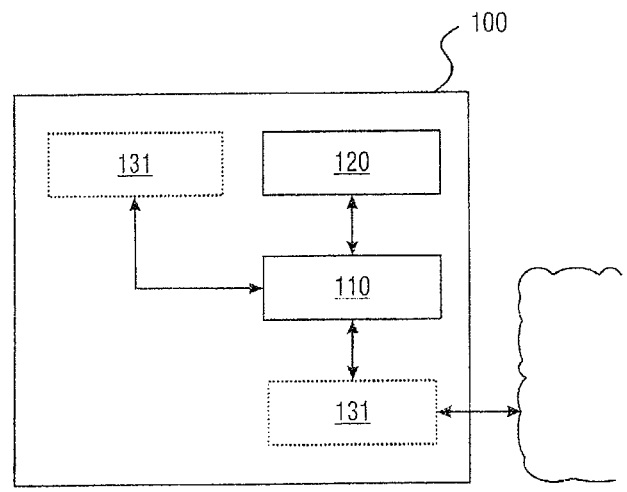
FIGS. 7A to 7C show schematic views of apparatus embodiments of the present invention.

FIG. 7A shows a general apparatus embodiment of the present invention. Specifically, there is shown an apparatus 100 comprising a processing unit 110 and a memory unit 120. The memory unit 120 may store code that, when executed on the processing unit 110, implements one or more method embodiments of the present invention.

Optionally, the apparatus 100 may comprise an imaging unit 131 for acquiring a digital image of a two-dimensional barcode as being applied, for example, on an item or a document. Further, the apparatus 100 may comprise a communication unit 132 for communicating an identification and/or decoding result to other entities, such as servers, controllers and the like. The communication may be effected over a network, such as a local area network (LAN), wireless network (WLAN), the internet, and the like. Further, also bus systems, such as CAN, can be employed for data exchange.

Figure 7B:
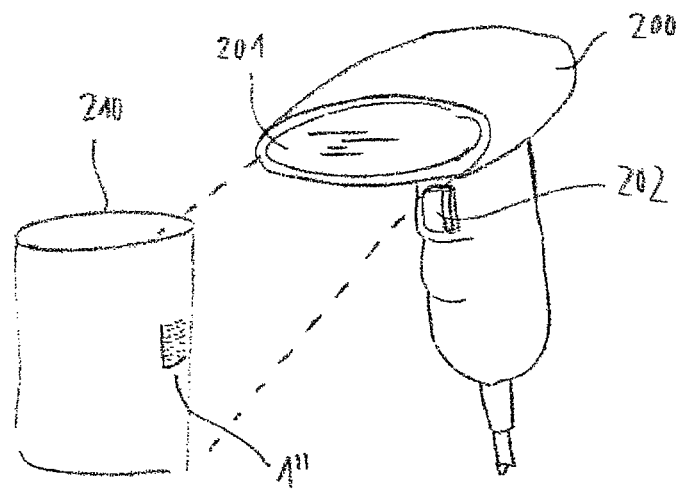

FIG. 7B shows a schematic view of a handheld embodiment of an apparatus for taking an image of the two-dimensional barcode and identifying and (optionally) decoding the same. The apparatus 200 comprises a window 201 through which a digital image of an item 210 can be acquired. A two-dimensional bar code 1" is applied to the item 210 by means of any mentioned printing, mechanical, physical, or chemical method. The apparatus 200 may further comprise an integrated processing unit (not shown) for performing one or more method of embodiments of the present invention. An additional operation element 202 may be provided for switching on and off the apparatus 200 and/or initiating the taking of a picture, acquiring/obtaining respective digital image data, and/or processing of the digital image data so as to identify and/or decode the two-dimensional barcode 1" on the item 210. The device may, of course, take other forms and may be wire-bound or wireless.

Figure 7C:
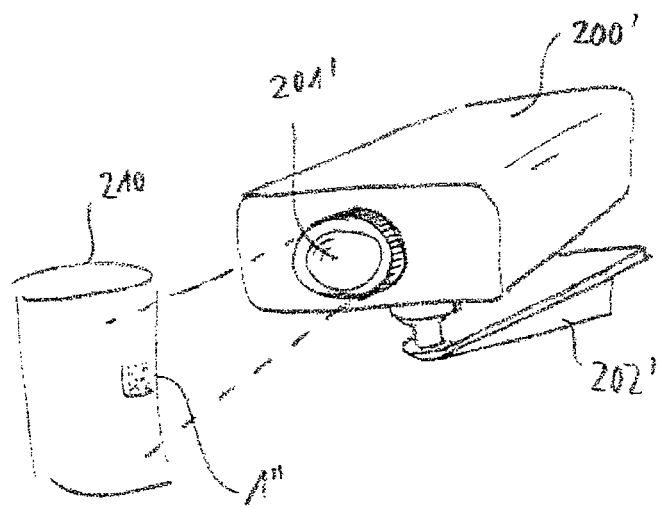

FIG. 7C shows a schematic view of a fixed type embodiment of an apparatus for taking an image of the two-dimensional barcode and identifying and (optionally) decoding the same. Like, for example, a module operable to be mounted on a production/distribution line for identifying two dimensional bar codes disposed on items transported on said line. Again, the apparatus 200' comprises a window 201' through which a digital image of an item 210 can be acquired with a two-dimensional bar code 1". The apparatus 200' may further comprise an integrated processing unit (not shown) for performing one or more method of embodiments of the present invention. An additional fixation element 202' may be provided for mounting the apparatus 200' on, for example, a production line in which a plurality of items 210 pass by the apparatus 200' for identification. The device may, of course, take other forms and may be wire-bound or wireless.

According to a further embodiment, there is provided a method of identifying a two-dimensional bar code in digital image data of the bar code, the bar code comprising first and second type elements arranged in an ordered grid and having an outline that comprises an L-shape clock line with transitions between the first and second type elements and an L-shape solid line without transitions between the first and second type elements, wherein approximate corners in the digital image data determine a first and a second pair of opposite edge segments along the outline. The method involves a scanning unit that performs scanning in the digital image data a first edge segment of the first pair and counting transitions between the first and second type elements along the first edge segment of the first pair; if no transitions were counted along the first edge segment of the first pair, then scanning in the digital image data the second edge segment of the first pair and counting transitions between the first and second type elements along the second edge segment of the first pair; scanning in the digital image data a first edge segment of the second pair and counting transitions between the first and second type elements along the first edge segment of the second pair; if no transitions were counted along the first edge segment of the second pair, then scanning in the digital image data the second edge segment of the second pair and counting transitions between the first and second type elements along the second edge segment of the second pair. The method further involves an identifying unit that performs identifying the edge segment of the first pair and the edge segment of the second pair along which transitions were counted as the L-shape clock line of the bar code, and identifying the edge segment of the first pair and the edge segment of the second pair along which no transitions were counted as the L-shape solid line of the bar code.

According to a further embodiment, there is provided a method of identifying a two-dimensional bar code in digital image data of the bar code, the bar code comprising first and second type elements arranged in an ordered grid and having an outline that comprises an L-shape clock line with transitions between the first and second type elements and an L-shape solid line without transitions between the first and second type elements, an intersection element at the corner of the L-shape clock line being of a predetermined type from the first and second type, wherein approximate corners in the digital image data determine a first and a second pair of opposite edge segments along the outline. The method involves a scanning unit that performs comprising scanning in the digital image data a first edge segment of the first pair and counting transitions between the first and second type elements along the first edge segment of the first pair; if no transitions were counted along the first edge segment of the first pair, then scanning in the digital image data the second edge segment of the first pair and counting transitions between the first and second type elements along the second edge segment of the first pair. The method further involves a determining unit that performs determining which extremity of the edge segment of the first pair along which transitions were counted corresponds to the intersection element. The scanning unit then performs scanning the edge segment of the second pair having the intersection element and counting transitions between the first and second type elements along the edge segment of the second pair having the intersection element. The method further involves an identifying unit that performs identifying the edge segment of the first pair and the edge segment of the second pair that intersect at the intersection element as the L-shape clock line of the bar code, and identifying the edge segment of the first pair and the edge segment of the second pair that not being part of the L-shape clock line as the L-shape solid line of the bar code.

Although detailed embodiments have been described, these only serve to provide a better understanding of the invention defined by the independent claims, and are not to be seen as limiting.

The invention claimed is:

1. A method of identifying a two-dimensional bar code in digital image data of the bar code, the bar code comprising first and second type elements arranged in an ordered grid and having an outline that comprises an L-shape clock line with transitions between the first and second type elements and an L-shape solid line without transitions between the first and second type elements, wherein approximate corners in the digital image data determine a first and a second pair of opposite edge segments along the outline, the method comprising:

scanning in the digital image data a first edge segment of the first pair and counting transitions between the first and second type elements along the first edge segment of the first pair;

if no transitions were counted along the first edge segment of the first pair, then scanning in the digital image data the second edge segment of the first pair and counting transitions between the first and second type elements along the second edge segment of the first pair;

scanning in the digital image data a first edge segment of the second pair and counting transitions between the first and second type elements along the first edge segment of the second pair;

if no transitions were counted along the first edge segment of the second pair, then scanning in the digital image data the second edge segment of the second pair and counting transitions between the first and second type elements along the second edge segment of the second pair;

identifying the edge segment of the first pair and the edge segment of the second pair along which transitions were counted as the L-shape clock line of the bar code, and identifying the edge segment of the first pair and the edge segment of the second pair along which no transitions were counted as the L-shape solid line of the bar code.

2. The method of claim 1, wherein the first type element is any one of a white color element, a bright color element, and an element that reflects more light, and wherein the second type element is any one of a black color element, a dark color element, and an element that reflects less light, and wherein the first type element corresponds in the digital image data to at least one pixel having a pixel value representing a brighter color and the second type element corresponds in the digital image data to at least one pixel having a pixel value representing a darker color darker than the brighter color.

3. The method of claim 1, wherein the two-dimensional bar code is printed, black and white printed, color printed, milled, etched, embossed, ground.

4. The method of claim 1, wherein a first leg of the L-shape clock line is longer than a second leg of the L-shape clock line and wherein the method further comprises determining the longer leg and shorter leg of the L-shape clock line based on the transitions counted along the edge segments along which transitions were counted.

5. The method of claim 4, wherein a first leg of the L-shape solid line is longer than a second leg of the L-shape solid line and wherein the method further comprises determining the longer leg and shorter leg of the L-shape solid line based on the determined longer leg and shorter leg of the L-shape clock line.

6. The method of claim 1, wherein the method further comprises obtaining the digital image data of the two-dimensional bar code.

7. The method of claim 1, wherein the method further comprises decoding the two-dimensional bar code based on the identified L-shape clock line and L-shape solid line.

8. A computer program comprising code instructing a processing unit in operation to perform a method of claim 1.

9. A non-transitory computer readable medium storing code instructing a processing unit in operation to perform a method of claim 1.

10. A method of identifying a two-dimensional bar code in digital image data of the bar code, the bar code comprising first and second type elements arranged in an ordered grid and having an outline that comprises an L-shape clock line with transitions between the first and second type elements and an L-shape solid line without transitions between the first and second type elements, an intersection element at the corner of the L-shape clock line being of a predetermined type from the first and second type, wherein approximate corners in the digital image data determine a first and a second pair of opposite edge segments along the outline, the method comprising:

scanning in the digital image data a first edge segment of the first pair and counting transitions between the first and second type elements along the first edge segment of the first pair;

if no transitions were counted along the first edge segment of the first pair, then scanning in the digital image data the second edge segment of the first pair and counting transitions between the first and second type elements along the second edge segment of the first pair;

determining which extremity of the edge segment of the first pair along which transitions were counted corresponds to the intersection element;

scanning the edge segment of the second pair having the intersection element and counting transitions between the first and second type elements along the edge segment of the second pair having the intersection element;

identifying the edge segment of the first pair and the edge segment of the second pair that intersect at the intersection element as the L-shape clock line of the bar code, and identifying the edge segment of the first pair and the edge segment of the second pair that not being part of the L-shape clock line as the L-shape solid line of the bar code.

11. The method of claim 10, wherein the predetermined type element is any one of a white color element or a bright color element, corresponding in the digital image data to at least one pixel having a pixel value representing a brighter color than a darker color.

12. An apparatus configured to identify a two-dimensional bar code in digital image data of the bar code, the bar code comprising first and second type elements arranged in an ordered grid and having an outline that comprises an L-shape clock line with transitions between the first and second type elements and an L-shape solid line without transitions between the first and second type elements, wherein approximate corners in the digital image data determine a first and a second pair of opposite edge segments along the outline, the apparatus comprising a processing unit being configured:

to scan in the digital image data a first edge segment of the first pair and counting transitions between the first and second type elements along the first edge segment of the first pair;

if no transitions were counted along the first edge segment of the first pair, then to scan in the digital image data the second edge segment of the first pair and counting transitions between the first and second type elements along the second edge segment of the first pair;

to scan in the digital image data a first edge segment of the second pair and counting transitions between the first and second type elements along the first edge segment of the second pair;

if no transitions were counted along the first edge segment of the second pair, then to scan in the digital image data the second edge segment of the second pair and counting transitions between the first and second type elements along the second edge segment of the second pair;

to identify the edge segment of the first pair and the edge segment of the second pair along which transitions were counted as the L-shape clock line of the bar code, and to identify the edge segment of the first pair and the edge segment of the second pair along which no transitions were counted as the L-shape solid line of the bar code.

13. The apparatus of claim 12, wherein the apparatus is configured as a hand-held device.

14. The apparatus of claim 12, wherein the apparatus is configured as a module.

15. The apparatus of claim 12, wherein the apparatus further comprises an imaging unit adapted to obtain the digital image data of the bar code.

16. The apparatus of claim 12, wherein the processing unit is configured to perform a method of any one of claims 3 to 9.

17. An apparatus configured to identify a two-dimensional bar code in digital image data of the bar code, the bar code comprising first and second type elements arranged in an ordered grid and having an outline that comprises an L-shape clock line with transitions between the first and second type elements and an L-shape solid line without transitions between the first and second type elements, an intersection element at the corner of the L-shape clock line being of a predetermined type from the first and second type, wherein approximate corners in the digital image data determine a first and a second pair of opposite edge segments along the outline, the apparatus comprising a processing unit being configured:

to scan in the digital image data a first edge segment of the first pair and counting transitions between the first and second type elements along the first edge segment of the first pair;

if no transitions were counted along the first edge segment of the first pair, then to scan in the digital image data the second edge segment of the first pair and counting transitions between the first and second type elements along the second edge segment of the first pair;

to determine which extremity of the edge segment of the first pair along which transitions were counted corresponds to the intersection element;

to scan the edge segment of the second pair having the intersection element and counting transitions between the first and second type elements along the edge segment of the second pair having the intersection element;

to identify the edge segment of the first pair and the edge segment of the second pair that intersect at the intersection element as the L-shape clock line of the bar code, and to identify the edge segment of the first pair and the edge segment of the second pair that not being part of the L-shape clock line as the L-shape solid line of the bar code.

* * * * *